No. 849,671. PATENTED APR. 9, 1907.
A. R. FRANCIS.
DEVICE FOR TESTING THE GERMINATING POWER OF SEED CORN.
APPLICATION FILED OCT. 2, 1905.

WITNESSES

INVENTOR
A. R. Francis
By Shepherd & Parker
Attorneys

UNITED STATES PATENT OFFICE.

ALFRED R. FRANCIS, OF KENT, IOWA.

DEVICE FOR TESTING THE GERMINATING POWER OF SEED-CORN.

No. 849,671.  Specification of Letters Patent.  Patented April 9, 1907.

Application filed October 2, 1905. Serial No. 281,026.

*To all whom it may concern:*

Be it known that I, ALFRED R. FRANCIS, a citizen of the United States, residing at Kent, in the county of Union and State of Iowa, have invented certain new and useful Improvements in Devices for Testing the Germinating Power of Seed-Corn, of which the following is a specification.

My invention relates to a device for testing the germinating power of seed-corn.

In many instances the germinating power of seed-corn is an unknown quantity, and it is desirable that a farmer before planting his seed in the ground should know of the strength or weakness of the corn in order to select only the seed possessing the necessary and requisite germinating power. It is a well-known fact that a great quantity of seed-corn will start a stalk-sprout, but is too weak to germinate a root-sprout and after a few days dies, while other grains will start a good root-sprout, but the stalk end of the kernel is dead. With these conditions before me I have devised an apparatus for testing kernels or seed-corn taken from different ears of corn to ascertain the germinating power thereof with a view to selecting only the desirable seed on the ears from which the tested and valuable kernels have been taken.

The invention consists, essentially, of a box or receptacle having its bottom covered to a desirable depth with sawdust or other suitable material which will absorb water and retain the moisture. Above this layer of sawdust the seed-corn to be tested is placed, preferably in separate compartments, as will be described, and a second layer of sawdust or other material which will absorb and retain moisture is placed over the contained seeds. The seeds to be tested are then placed in a warm room or exposed to the required temperature of heat to germinate the seed.

The invention consists, further, in certain novel features of construction and combinations and arrangements of parts, as will be disclosed hereinafter.

In the accompanying drawings I have illustrated one example of the physical embodiment of my invention constructed according to the best mode I have so far devised for the practical application of the principle.

Figure 1:
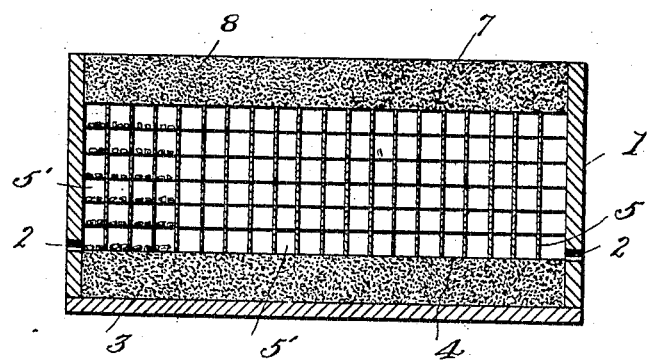
Figure 2:
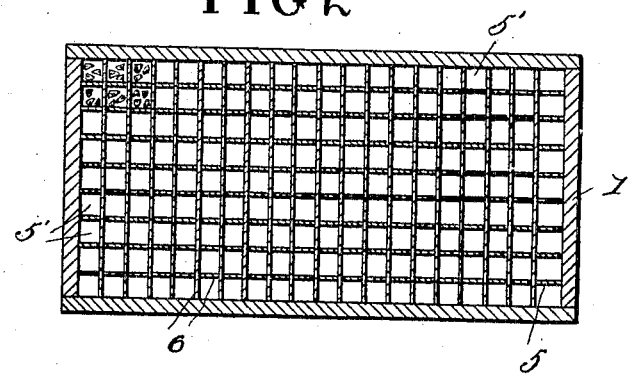
Figure 3:
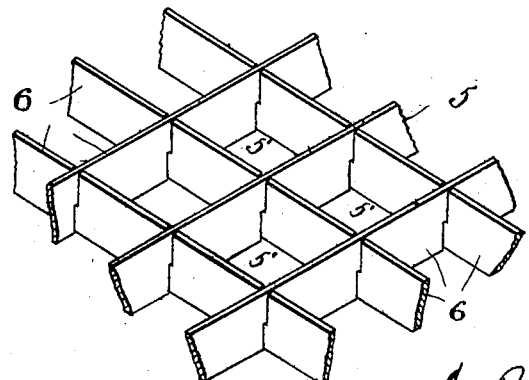

Figure 1 is a vertical central sectional view of a device embodying the novel features of the invention. Fig. 2 is a horizontal sectional view of the same, and Fig. 3 is an enlarged broken detailed perspective view of one of the sectional crates employed in carrying out the invention.

In the practical application of my invention I take an ordinary box or other receptacle, as 1, which may be constructed of wood, as illustrated, or, if desired, metal may be employed. A short distance above the bottom of the box 1 a small hole or holes 2 2 are drilled, and the box is then filled with absorbent material, as sawdust (indicated at 3,) up to the bottom or lower end of the holes 2. The sawdust is pressed down hard or solid and level on top, and over the sawdust is spread a cloth 4, which has an indication or mark printed or otherwise placed thereon for identification. A sectional crate, as 5, is located upon the cloth 4. This crate is provided with compartments 5', formed by the cross-pieces 6 6, into which compartments the seeds for germinating are placed. As many of these cloths and crates may be employed as the box will accommodate, six crates being illustrated in this instance. Above the upper cloth 7 a second layer of sawdust 8 is disposed.

Each of the squares or compartments in the crates are numbered, and each of the cloths have an identification-mark—as, for instance, the first cloth may be lettered "A" and the squares in the first crate numbered from "1" up, the second cloth lettered "B" and the squares in the second compartment numbered in order, and the third cloth "C," &c., until all the cloths and crates have their own identification-marks.

In use the corn to be tested is taken ear at a time and seeds or kernels extracted therefrom. After the sawdust has covered the bottom of the box the first cloth is laid thereon and the first crate placed on the cloth. A suitable number of kernels is taken from an ear and placed in the first compartment in the first crate. The ear from which the kernels were taken is marked "A-1." A second ear is taken and some of its kernels placed in the second compartment, the ear being marked "A-2," and so on until the crate is filled. A second cloth is placed as a cover over the first crate and a second crate placed over the second cloth, and the procedure as in the first instance is repeated, but the letter "B" is used on the ears of corn. This process is continued until all the squares or compartments in all the crates have seeds in them, and the marked ears are laid away for future reference. After a sufficient number of crates have been filled the cloth 7 is laid on and the top layer of sawdust placed on the cloth. Water and heat being all that is necessary to germinate seed-corn, water is now poured over the top layer of sawdust and allowed to soak through until it fills the lower stratum of sawdust and runs out through the small holes in the box. The box is then set away for a sufficient time—say about five days—and is subjected to the required temperature of heat. After a sufficient time has elapsed the top layer of sawdust is removed, the cloth taken off, the kernels inspected, and the ears of corn which correspond with grains or seeds of their respective letter and number are accepted or rejected according to the demonstrated germinating power of the tested seeds.

From the above description, taken in connection with the drawings, it becomes obvious that I have produced a device which is cheap in cost, inexpensive in operation, simple in construction, and one that requires very little attention.

The device is efficient in that the grains or seeds are separated from each other, and the compartments prevent the seeds from being mixed, so that the desirable ears of corn may be selected with accuracy and reliability.

Having thus fully described my invention, what I claim as new, and desire to secure by Letters Patent, is—

1. In a seed-testing device, the combination with a receptacle, of a plurality of crates, each of said crates having a plurality of compartments, located in said receptacle, a layer of sawdust or like material beneath said crates, pervious cloths between each of the crates, said receptacle having a moisture-discharging opening located slightly above the said layer of sawdust and a layer of sawdust or other absorbent material above the crates.

2. In a seed-testing device, a receptacle having therein a moisture-absorbent material, a series of crates having compartments therein, cloths located between said crates, and a cover of absorbent material.

3. In a device as described, a receptacle having therein a layer of water-absorbent material, means for disposing of surplus water, sectional crates located above said absorbent material, pervious cloths between the crates, and a cover of absorbent material.

4. In a seed-testing device, a receptacle having therein a layer of sawdust, a series of crates located above the sawdust, pervious cloths located between said crates, and a cover of sawdust above the uppermost cloth, all combined.

In testimony whereof I affix my signature in presence of two witnesses.

ALFRED R. FRANCIS.

Witnesses:
PETER BROGAN,
S. E. WRIGHT.